United States Patent

Montagne

[15] 3,664,402
[45] May 23, 1972

[54] TREAD FOR HEAVY-DUTY RADIAL-CARCASS TIRE

[72] Inventor: Jean B. Montagne, Cebazat, France

[73] Assignee: Compagnie Generale Des Etablissements Michelin raison sociale Michelin & Cie, Chermont-Ferrand (Puy-de-Dome), France

[22] Filed: June 15, 1970

[21] Appl. No.: 46,282

[30] Foreign Application Priority Data

June 19, 1969 France..................................6920626

[52] U.S. Cl..........................................................152/209
[51] Int. Cl.....................................B60c 11/04, B60c 11/06
[58] Field of Search....................................................152/209

[56] References Cited

UNITED STATES PATENTS

| | | | |
|---|---|---|---|
| 3,055,410 | 9/1962 | Caulkins | 152/209 R |
| 2,260,193 | 10/1941 | Overman | 152/209 R |
| 2,290,625 | 7/1942 | Stein | 152/209 R |
| 2,756,797 | 7/1956 | Campbell | 152/209 R |
| 3,095,024 | 6/1963 | Robertson | 152/209 R |

Primary Examiner—Drayton E. Hoffman
Attorney—Brumbaugh, Graves, Donohue & Raymond

[57] ABSTRACT

A tire tread formed with circumferential zigzag ribs bordered by circumferential zigzag grooves is characterized in that the lateral walls of the ribs have a variable inclination with respect to the perpendicular to the tread. The minimum inclination is close to and on the side of portions of the ribs that project with respect to the grooves, and the maximum inclination is close to and on the side of portions of the ribs that are re-entrant with respect to the grooves.

6 Claims, 7 Drawing Figures

PATENTED MAY 23 1972 3,664,402
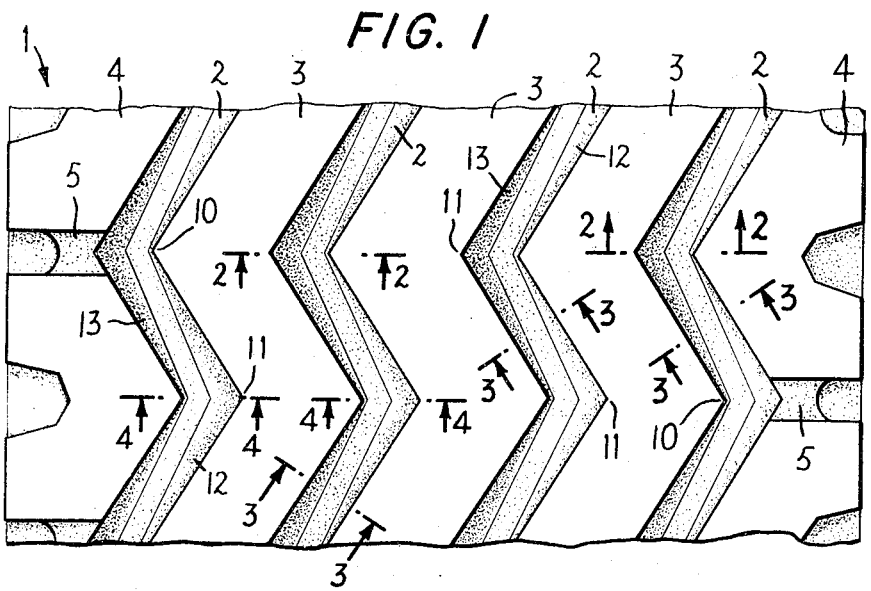
INVENTOR.
JEAN BERNARD MONTAGNE
BY
Brumbaugh, Graves, Donohue & Raymond
his ATTORNEYS

TREAD FOR HEAVY-DUTY RADIAL-CARCASS TIRE

BACKGROUND OF THE INVENTION

This invention relates to tires and, more particularly, to novel and highly-effective tires of the radial-carcass-type, whether new or retreaded, to be used on automotive vehicles in the heavy-duty class.

The radial-carcass-type tires used for heavy duty are conventionally provided with a thread which is divided into a number of circumferential ridges by circumferential zigzag grooves. It has been found that this type of tire is subject to wear and tear of a special kind caused by prolonged travel on roadways which normally cause little wear, such as superhighways. Around the grooves furrows form and become gradually wider and deeper and start to affect the tops of the ridges in that the elastomer juts out into the grooves.

SUMMARY OF THE INVENTION

An object of the present invention is to remedy the problems of heavy-duty radial-carcass tires outlined above and, in particular, to improve or eliminate this furrow-type wear and tear.

The foregoing and other objects are attained in accordance with the invention by providing a tread formed with continuous or discontinuous circumferential ridges in a zigzag pattern and bordered by grooves also running zigzag. The tread is characterized in that the lateral walls of the ridges have a variable inclination with respect to the perpendicular to the tread, whereby the minimum angle is close to projecting portions of the ridges and the maximum angle is close to re-entrant portions of the ridges.

It is surprising that the kind of wear and tear under discussion should depend upon the inclination, with respect to the normal to the rolling surface, of the walls of the ridges, especially where the ridges project into the grooves. A certain inclination of the walls of the ridges is desirable, especially in order to facilitate the unmolding of the tire at the end of its manufacture, and to improve the draining of the water and removal of foreign bodies while rolling. Conveniently, one provides a substantially constant inclination all along the path of the ridges. In other words, the transverse cross section of each groove or ridge is generally constant in area and in shape. If the shape of the transverse cross section of the grooves is varied from a V-shape with one branch of the V almost perpendicular to the surface of the tread, to a shape wherein it is the other branch which is in substantially perpendicular relation to the surface of the tread, whereby all intermediate inclinations are passed through, including a form in which the two branches are symmetrically inclined, one preserves all the advantages of an inclination of the lateral walls of the ridges and can influence the degree of wear and tear in the form of furrows. It has been found that, if the minimum inclination is close to and on the side of portions of the ribs that project with respect to the grooves and the maximum inclinations are close to and on the side of portions of the ribs that are re-entrant with respect to the grooves, the degree of wear and tear is reduced in comparison to that of conventional tires, wherein the inclination remains constant all along the ridges. The reverse phenomenon is produced if the maximum inclination occurs at the projecting portions and the minimum inclination at the re-entering portions of the ridges.

In accordance with a preferred arrangement, the changes in inclination of the two walls of a groove are achieved in a manner whereby the area of the transverse cross section of the groove is kept substantially constant, or in any case in a manner whereby the area of the transverse section is everywhere at least equal to that of the groove at the place in which it has a symmetrically shaped cross section.

As an example, the angle of inclination may vary from −10° to +20° or +30°, while usually it has a substantially constant size ranging around +10° to +15°.

It may be desirable to combine the use of a variable inclination of the wall of the ridges with the use of fine cutouts in the edges of the ridges such as described in French Pat. No. 1,544,747.

In accordance with the invention, one achieves also an additional reduction in wear in the form of furrows by making use of zigzag grooves the segments of which are only slightly inclined with respect to the direction of the circumference and form an angle with the circumference which does not exceed 10° to 20°.

BRIEF DESCRIPTION OF THE DRAWING

An understanding of additional aspects of the invention can be gained from a consideration of the following detailed description of representative embodiments thereof, in conjunction with the appended figures of the drawing, wherein:

FIG. 1 is a plan view of a portion of a first representative embodiment of a tire tread in accordance with the invention;

FIGS. 2, 3 and 4 are radial cross sectional views on a larger scale through the lines 2—2, 3—3 and 4—4, respectively, of FIG. 1, looking in the directions of the arrows;

FIG. 5 is a plan view on a smaller scale of part of a tire tread in accordance with the invention comprising grooves, the segments of which are only slightly inclined in relation to the circumferential direction;

FIG. 6 is a radial cross section, on the scale of FIGS. 2–4, of a groove the walls of which are undercut at the projecting angles of the ridges; and FIG. 7 is a diagrammatic view, on a much smaller scale, partly broken away, of a radial-carcass tire, on which the tread of the invention is particularly adapted to be employed.

DESCRIPTION OF THE PREFERRED EMBODIMENTS

FIG. 1 shows a portion of a tread 1 of a radial-carcass tire measuring 11.00 × 20. The tread comprises four zigzag grooves 2 delimiting three zigzag ribs 3 and two lateral ribs 4. It moreover comprises transverse grooves 5 on the edges of the tread. Each rib 3 or 4 comprises projecting angles or other projecting portions, such as 10, and re-entering angles on other re-entrant portions, such as 11. On the side of the grooves 2 it is limited by the walls 12 or 13.

As may be seen in FIG. 2, the walls 12, near the vertices of the projecting angles 10, are substantially perpendicular to the surface of the tread, the angle with the normal being about +3°.

The walls 13 are on the side of the re-entering angles 11 in FIG. 2 and are inclined at an angle alpha which is comparatively large and which, in the case shown in the figure, is about +28°. The angle alpha may be as large as 30°. FIG. 4 shows the opposite situation, namely, the wall 12 being inclined and the walls 13 being essentially perpendicular at the location of the cross section.

FIG. 3 shows one situation in between, in which the two walls 12 and 13 have symmetrical inclinations β of +16°.

FIG. 5 shows an embodiment of the invention in which the various segments forming the zigzag ridges are inclined in relation to the circumferential direction A at an angle B which, in the example illustrated, is 15°. This angle should be within the range of 10° to 20°.

FIG. 6 illustrates a case in which the walls 13 of the grooves are undercut, being inclined at an angle β of −5° in relation to the normal. The angle β may range up to −10°.

FIG. 7 shows a radial tire, in which the tread in accordance with the present invention is particularly adapted to be employed. The figure is partly broken away to reveal carcass cords 15 extending in a generally radial direction.

In place of the zigzag grooves and ribs defining a broken-line pattern with well-defined angles, as illustrated, one may also use zigzag grooves and ribs in the form of sine waves or other waves, even though such a design is less desirable.

Thus, there is provided in accordance with the invention a novel and highly effective heavy-duty tire of the radial-carcass type that is not subject to the furrow-type wear and tear that has heretofore characterized heavy-duty radial-carcass tires.

Many modifications of the preferred embodiments disclosed herein that are within the spirit and scope of the invention will readily occur to those skilled in the art upon a reading of the present specification. Accordingly, the invention is to be construed as including all of the embodiments thereof that fall within the scope of the appended claims.

I claim:

1. A tire comprising a tread formed with circumferential zigzag ribs bordered by circumferential zigzag grooves, characterized in that the lateral walls of the ribs are warped in such a manner as to have an inclination with respect to the perpendicular to the tread which varies as a function of circumferential position, said inclination being at a minimum close to and on the side of portions of the ribs that project with respect to the grooves and at a maximum close to and on the side of portions of the ribs that are re-entrant with respect to the grooves.

2. A tire according to claim 1 wherein the inclination varies from −10° to +30°.

3. A tire according to claim 1 wherein the transverse cross section of the grooves has a substantially constant area at all locations along the length of the grooves.

4. A tire according to claim 1 wherein the grooves at some locations between said projecting and re-entrant rib portions assume a symmetrical shape and wherein the transverse cross section of the grooves has an area at all locations along the length of the grooves of at least equal to the area of the transverse cross section of the grooves at locations where the grooves have a symmetrical shape.

5. A tire according to claim 1 wherein the zigzag ribs and grooves comprise segments each inclined with respect to the circumferential direction by 10° to 20°.

6. A tire according to claim 1 comprising a radial carcass.

* * * * *